Aug. 2, 1966            E. H. ROSS            3,263,439
REFRIGERATION APPARATUS FOR KILLING WEEDS
Filed July 26, 1965
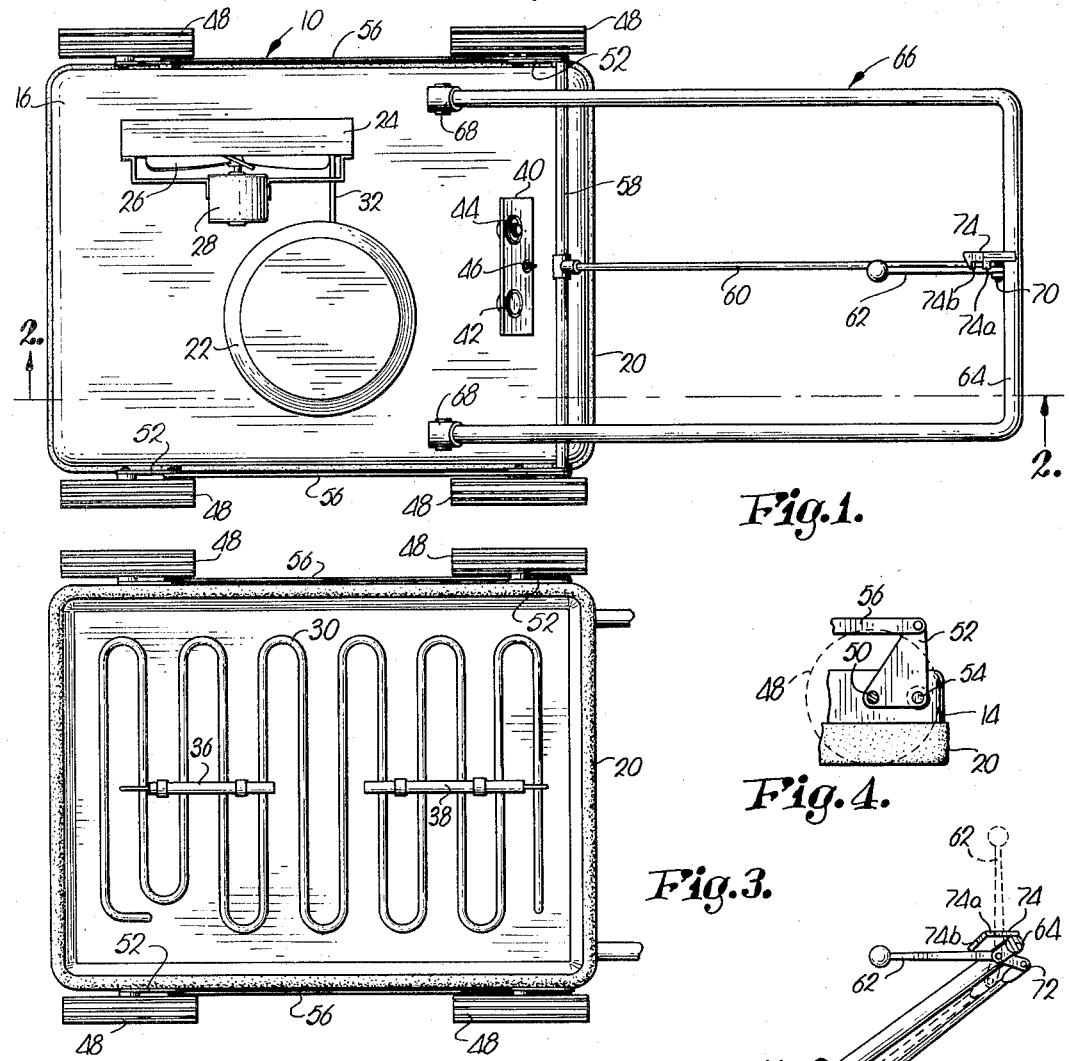
Fig.1.
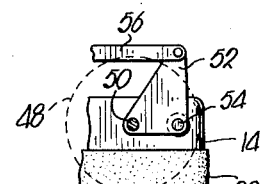
Fig.4.
Fig.3.
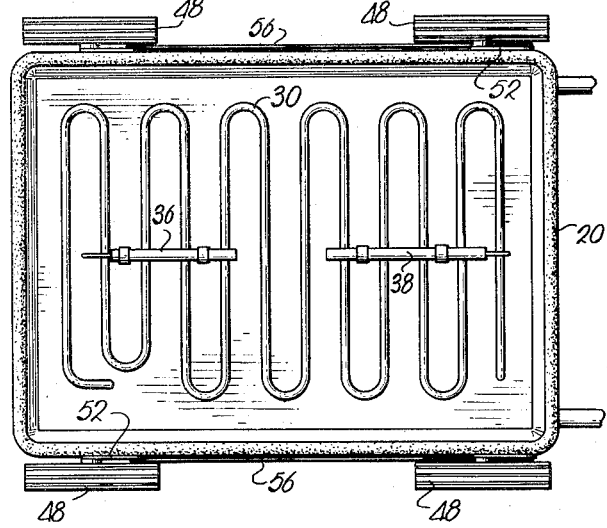
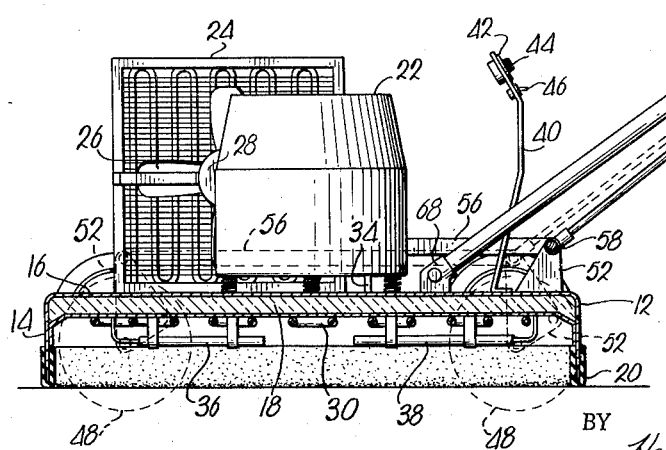
Fig.2.
INVENTOR
Ellis Howard Ross
BY Hovey, Schmidt, Johnson & Hovey
ATTORNEYS.

United States Patent Office 3,263,439
Patented August 2, 1966

3,263,439
REFRIGERATION APPARATUS FOR
KILLING WEEDS
Ellis Howard Ross, 1241 W. 31st St., Topeka, Kans.
Filed July 26, 1965, Ser. No. 474,564
5 Claims. (Cl. 62—228)

This invention relates to a method and apparatus for use in treating lawns to kill undesirable plant life such as weeds and the like while leaving frost resistant grasses unharmed.

A number of sprays are presently commercially available which are effective in controlling the growth of broadleaf plant life on lawns. Desirable grasses such as bluegrass are usually not of the broadleaf variety and thus are unaffected by these sprays. However, problems frequently arise in the application of lawn sprays in that the chemical employed is also capable of damaging trees and shrubs as well as the undesirable weed growth. Therefore, spray treatment is restricted to use in relatively open areas that do not contain trees with low branches, shrubs, or flower beds. Additionally, birds feed on insects which are contacted by the spray, oftentimes resulting in death of the birds due to poisoning.

It has been observed that in the fall of the year the occurrence of the first frost greatly mitigates the weed problem. Most undesirable plant life thrives in warm weather and cannot withstand freezing or near freezing temperatures. Many desirable lawn grasses, however, readily withstand freezing temperatures until early winter and often thrive during the fall and winter season after the first frost.

It is, therefore, the primary object of this invention to provide a method of simulating the effect of nature in the killing of undesirable weeds and grasses through the use of freezing temperatures.

As a corollary to the above object, it is a further aim of the instant invention to provide mobile apparatus which may be moved over the ground surface of a lawn to effect the weed-killing operation.

A specific object of this invention is to provide apparatus as aforesaid capable of insulating a zone of a lawn under treatment from ambient air and then refrigerating the thermally isolated zone to kill undesirable plant life therein.

Still another object of the instant invention is to provide weed-killing apparatus having a mobile refrigeration unit operable in conjunction with means for temporarily thermally insulating a zone of ground under treatment to thereby cool said zone to freezing temperatures to kill the weeds therein.

Other objects will become apparent as the detailed description proceeds.

In the drawing:

FIGURE 1 is a plan view of the weed-killing apparatus;

FIG. 2 is a vertical sectional view taken along line 2—2 of FIG. 1;

FIG. 3 is a bottom view of the carrier portion of the apparatus; and

FIG. 4 is a fragmentary, detailed view showing one of the wheel mountings.

The numeral 10 broadly denotes a wheeled carrier comprising a shroud 12 provided with a depending skirt 14. Shroud 12 includes a central, horizontal platform 16 of double-wall construction (FIG. 2), insulating material 18 being disposed between the double walls. It may be noted that the shroud 12 is of rectangular configuration and that skirt 14 forms the ground-engaging periphery thereof as illustrated in FIG. 2. A flexible, transversely U-shaped member or band 20 surrounds the lower margin of skirt 14 and yields to conform to the contour of the soil. Band 20 is composed of rubber or any similar substance having good insulating properties.

A refrigeration unit is mounted on platform 16 and comprises a compressor 22 having a self-contained electric drive motor, a condenser 24 provided with a cooling fan 26 driven by electric motor 28, and an evaporator 30 disposed beneath platform 16 as shown in FIGS. 2 and 3. A refrigerant line 32 (FIG. 1) intercommunicates the compressor output and the coils of condenser 24, while a line 34 extends from the base of the compressor 22 to the right end of the coil of evaporator 30. Line 34 may be embedded in insulation 18 if desired. The connection to the left end of evaporator 30 is effected at the outlet of condenser 24 through an expansion valve (not shown) to complete the refrigeration system.

In order to control and regulate the temperature within shroud 12 when band 20 is in engagement with the ground, a temperature gauge sensor 36 and a thermostat control sensor 38 are mounted beneath platform 16 in spaced relationship to the coils of evaporator 30. An upstanding control panel 40 is provided with a temperature gauge 42, a thermostat control 44, and a power on-off switch 46. Gauge 42 and thermostat 44 are interconnected with their respective sensors and the refrigeration unit in the conventional manner, switch 46 being employed to control energization of motor 28 and the motor of compressor 22 as desired. Electrical power for the unit may be obtained from a conventional 60 cycle A.C. outlet and a power cord of sufficient length employed to permit movement of the carrier to the various sections of a lawn to be treated.

Carrier 10 is provided with four wheels 48 which are shiftable simultaneously between upper and lower positions as illustrated in FIG. 2. The lower position of each wheel 48 is shown in broken lines, while the solid lines show the wheels in their upper positions permitting band 20 to engage the surface of the ground.

Each wheel 48 is provided with an axle 50 secured to one apex of a bell crank 52 as shown in detail in FIG. 4. A pivot pin 54 journals the crank on the skirt portion 14 of carrier 10, a pair of link arms 56 being employed to interconnect the cranks of the two wheels on each side of the carrier. A crossbar 58 has its ends attached to the two cranks 52 of the right-hand or rear wheels, a rod 60 being employed to couple bar 58 with an operating lever 62 swingably mounted on the handle 64 of a U-shaped pusher member 66. The legs of member 66 have their free ends attached to carrier 10 as illustrated at 68.

Lever 62 is swingably mounted on handle 64 by a pivot pin 70 adjacent one end of the lever, such end being pivotally attached to the upper end of rod 60 by a connection 72. A catch 74 provided with a projection 74a is disposed to receive lever 62 when the same is in the broken-line position shown in FIG. 2. Catch 74 is also provided with a projection 74b for holding lever 62 in an intermediate position (not shown) midway between the full and broken line positions. Sufficient play is left in the interconnection of lever 62 and pin 70 to permit slight lateral movement of the lever around the projections of catch 74 during movement of the lever from the solid-line to the intermediate or the broken-line position.

In operation, lever 62 is initially at the upright, broken-line position and held in place by projection 74a. In this position, the cranks 52 are shifted counterclockwise from their full-line positions to the broken-line positions illustrated in FIG. 2. This lowers wheels 48 and allows the carrier to be pushed over the surface of the ground. When the zone to be treated is reached, lever 62 is released to thereby permit the carrier to settle into engagement with the ground. At this time, band 20 flexes to conform to the contour of the ground surface.

With the flexible band in engagement with the ground, it will be appreciated that the zone under treatment covered by shroud 12 is effectively insulated from ambient heat. Thus, the refrigeration unit is effective to cool the vegetation beneath the shroud to the desired weed-killing temperature. Temperature gauge 42 monitors the temperature condition beneath the shroud while thermostat 44 is available so that the operator may limit the minimum temperature obtained. After a freezing temperature is maintained beneath the shroud for a sufficient period of time to effect killing of undesirable plant life, lever 62 is again operated to lower the wheels and permit movement of the carrier to the next ground zone to be treated. Thus, the operation is continuous from location-to-location.

It will be appreciated that the thermal isolation affect of shroud 12 and band 20 not only enables the refrigeration unit to produce the desired low temperature, but this feature also allows surrounding foliage to remain at substantially the temperature of ambient air. In this manner, flowers, shrubs and trees are not adversely affected by the weed-killing operation, nor are desired grasses in the lawn area under treatment which readily survive at freezing temperatures. Thermostat 44 is available for use as a control to positively prevent the obtaining of extremely low temperatures beneath the shroud which might damage the desirable grass.

If sufficient cooling power is available, the apparatus is capable of an additional mode of operation in which the intermediate position of lever 62 is especially useful. In this position, it will be appreciated that band 20 contacts the ground, but that the carrier is supported and thus may be moved over the ground surface. Therefore, treatment of the lawn area may be effected without continually manipulating lever 62, and by pushing the carrier along the ground in a continuous fashion. Additional lever positions may be provided if desired.

Having thus described the invention, what is claimed as new and desired to be secured by Letters Patent is:

1. Apparatus for treating vegetation to kill undesirable plant life incapable of survival at low temperatures while leaving frost resistant grasses unharmed, said apparatus comprising:
   a wheeled carrier having a shroud provided with a ground-engaging skirt; and
   a refrigeration unit mounted on said carrier and including an evaporator within said shroud disposed to lower the temperature of the ground covered by the shroud when said skirt is in engagement with said ground, whereby to kill the undesirable plant life growing in said ground,
   said shroud including an insulated, normally generally horizontal platform supporting said unit with said evaporator disposed adjacent the underside of the platform,
   said unit being provided with a thermostatic control having a temperature sensor disposed beneath said evaporator in spaced relationship thereto and overlying the ground when the latter is engaged by the skirt.

2. The invention of claim 1,
   said skirt being provided with a flexible, insulating member defining the ground-engaging periphery thereof and adapted to conform to the contour of said ground upon engagement therewith.

3. The invention of claim 1,
   said carrier being provided with a plurality of wheels and means coupled with said wheels for shifting the latter between lower positions supporting said skirt in spaced relationship to said ground and upper positions permitting engagement of the skirt with the ground, whereby movement of the apparatus may be readily effected when the wheels are in their lower positions and operation of the unit to kill the undesirable plant life is effected when the wheels are in their upper positions to thereby insulate the vegetation under treatment from ambient heat.

4. The invention of claim 3,
   each of said wheels having an axle,
   said wheel shifting means comprising a crank device supporting each of said axles respectively and journalled on said carrier, linkage means interconnecting said devices for movement in unison to shift said wheels simultaneously between said positions thereof, and manually operable structure coupled with said linkage means for controlling the elevation of said wheels.

5. The invention of claim 3,
   said wheel shifting means being operable to move each of said wheels to an intermediate position between said lower and upper positions thereof where said skirt is in substantial contact with the ground but out of carrier immobilizing engagement therewith, whereby to permit effective operation of the unit while the carrier is mobile.

References Cited by the Examiner
UNITED STATES PATENTS 2,290,942   7/1942   Clary et al. _____ 62—62 X ROBERT A. O'LEARY, *Primary Examiner.*

W. E. WAYNER, *Assistant Examiner.*